Patented Mar. 5, 1946

2,396,115

UNITED STATES PATENT OFFICE 2,396,115

PRODUCTION OF MONO-CALCIUM CITRATE

Richard S. Nicholls, Elkhart, Ind., assignor to Miles Laboratories, Inc., Elkhart, Ind., a corporation of Indiana No Drawing. Application November 8, 1943, Serial No. 509,477

7 Claims. (Cl. 260—535)

The present invention relates generally to the production of citric acid compounds containing calcium, in solid form, which are water soluble, and particularly to the production of substantially pure form of a mono-calcium citrate.

The products of the present invention are of use in the preparation of pharmaceutical products and mixtures by means of which calcium may be administered orally to humans in the treatment of cases of calcium deficiencies. Because they are water soluble, and because they are acidic in nature, they may be combined with a salt of carbonic acid to produce mixtures which, when added to water, dissolve with effervescence to give clear, sparkling, carbonated solutions which may be used therapeutically for the administration of calcium. They may also be combined with acidic phosphates in conjunction with a salt of carbonic acid for the production of clear, sparkling carbonated solutions containing calcium and phosphorous for the therapeutic administration of these two elements. In both these cases the solutions produced are attractive in appearance and very palatable and of a consequence make for a favorable reaction on the part of the person to whom they are given. They thus provide means of administering calcium, or calcium and phosphorous in conjunction, which are not attended by the disadvantages of insolubility or unpalatability to be found in many of the substances and products at present in use for those purposes. The products of the present invention may also be used generally where a solid substance of an acidic nature is required, for example, as one component of a baking powder.

Heretofore, when the production of mono-calcium citrate has been attempted, the salt has first been produced in solution and its recovery in solid form undertaken, as by crystallization or as a residue on drying; but these have not been successful from an economic point of view. Conversions to di- and tri-calcium citrates readily occur which render the end product incompletely soluble, so that an undissolved residue would be present in the uses above described. The present invention provides a process which easily and cheaply permits the production of a water-soluble mono-calcium salt or compound mixture embodying such salt.

It is the general object of this invention to produce a readily water-soluble mono-calcium citrate in dry solid form.

It is a particular object of this invention to provide dry solid compositions which are essentially mono-calcium citrate with or without excess of citric acid, which compositions having an excess of citric acid may be dissolved readily in water to provide a clear solution.

It is a particular object of this invention to provide a means of extracting from those compositions above, having an excess of citric acid, the said excess of citric acid so as to leave substantially pure mono-calcium citrate in dry solid form which is water-soluble.

It is also an object of this invention to produce a mono-calcium citrate composition, with or without excess citric acid, which may be mixed with a salt of carbonic acid in the dry state, the mixture being readily soluble in water with effervescence and without residue to yield a palatable carbonated potion.

It is a particular object of this invention to produce the desired compositions by action of reagents in part at least suspended in water, that is, in a medium which is an aqueous paste.

Various other and ancillary objects and advantages of the invention will become apparent from the following description and explanation of the invention.

The chemistry of calcium citrate formation is complex and has not been well developed in the literature. The practically insoluble tri-calcium citrate is well known and is handled in large quantities in the commercial manufacture of citric acid. Di-calcium citrate, also of low solubility, is not as well known, but to mono-calcium citrate, the only relatively soluble member of the group, there is little reference. Contrary, perhaps, to expectations when thought is first directed to the problem, the production of the mono-calcium salt has not proved easy, and has presented real difficulties.

Theoretically, one might expect to form mono-calcium citrate in one direction by the action of citric acid on either tri-calcium citrate or di-calcium citrate, and in the other direction by the action of citric acid on the oxide, hydroxide or carbonate of calcium. Experience has shown that while di-calcium or tri-calcium citrate may be reacted with citric acid with the formation of some mono-calcium citrate, the reaction does not go to completion, and a completely soluble product is not formed. The strength of citric acid is apparently not great enough to bring about fully the desired conversion.

On the other hand, the production of mono-calcium citrate from citric acid and the oxide, hydroxide or carbonate of calcium also presents difficulties. For example, it is quite readily possible to add to a solution of 2 moles of citric acid 1 mole of either calcium hydroxide or calcium carbonate, which are the stoichiometric proportions for the formation of mono-calcium citrate $$Ca(H_2.C_6H_5O_7)_2$$

and produce a clear solution. But it has not been possible to isolate the mono-calcium citrate from this solution in dry solid form. Attempts at concentrating the solution, even under reduced pressures and at temperatures not greatly above room temperature, result merely in the deposition of di-calcium and not the required mono-calcium citrate. In fact, if left to stand for a period of time under normal conditions of temperature and pressure, the originally clear solution will slowly deposit a precipitate which is a mixture of di-calcium and mono-calcium citrates, the former being in excess. Nor has it been found possible to bring about the desired result by using citric acid in excess of the 2 moles theoretically required. Again attempts to concentrate the clear solutions in order to precipitate the desired mono-calcium citrate result in the formation of insoluble di-calcium citrate. Kovalenko (Proceedings in Tobacco Chemistry, U. S. S. R., I, Bulletin No. 133, 111–116, 1937) concludes that mono-calcium citrate cannot be prepared from calcium carbonate and citric acid only, but that an additional acidifying agent is required. These findings are corroborated by the present inventor as long as the attempt is made, first, to produce a solution of mono-calcium citrate, and then to isolate from this solution the desired substance.

The present invention brings about the formation of mono-calcium citrate from citric acid and calcium carbonate, hydroxide or oxide only, by the expedient of conducting the reaction between suspended solids in a relatively small quantity of water insufficient to dissolve the reacting contents. The reacting ingredients and water are quickly and thoroughly mixed. Preferably the solids are first thoroughly mixed in a dry state, then wetted with water in quantity to provide a workable paste. Reaction automatically ensues with the generation of some heat and a setting of the paste into an almost dry cake. This cake is readily broken up and any excess moisture removed by drying the fragments either in air at room temperature and pressure or under gentle heat. The dried fragments are readily powdered. Thus the formed product, in course of its formation, comes out of solution, whereby it is not subject to those conversions above mentioned, which form insoluble calcium citrate.

The calcium reagent is selected from the group consisting of the oxide, hydroxide and carbonate of calcium. All provide heat by neutralization and/or dissolution, the heat being greatest in the order of the grouping above. Calcium carbonate is preferred because it is stable in air, is more readily obtained in a pure form, and is more easily handled, and because the effervescence which results from its use causes the formation of an expanded porous dry cake as the end-product of the reaction which is easy to handle and break up in subsequent processing.

The citric acid reagent is selected from the group consisting of the anhydrous powder or crystals and the hydrated powder or crystals of citric acid, the latter having one mole of water per mole of citric acid. The powdered form is preferred since it may be more intimately mixed with the calcium reagent and the anhydrous form is preferred to reduce water content.

Theoretically mono-calcium citrate should be formed from the reaction between one mole of calcium reagent with two moles of citric acid reagent as illustrated in the following equation:

$$CaCO_3 + 2H_3Cit + H_2O \rightarrow Ca(H_2Cit)_2.2H_2O + CO_2$$

"Cit." being used to represent the citrate ion $C_6H_5O_7\equiv$

When these amounts of reagents, namely, one mole of calcium reagent and two moles of citric acid reagent, are used in the process outlined above for making mono-calcium citrate by suspension of the reagents in water to form an equaous paste, the reaction proceeds almost but not quite to completion according to theory. The product is largely water soluble, the greater part of it dissolving when shaken with water, the insoluble portion being only sufficient to make the solution opalescent. Analysis has shown that the product corresponds substantially to mono-calcium citrate with which are admixed a small amount of free citric acid, and a small amount of insoluble di-calcium citrate. The amount of free citric acid in the composition has been determined to be in the range from .1% to 1.5% by weight, the determination being effected by extracting the free citric acid by solvent acetone, and titrating the extracted acid.

It has been found that by increasing the amount of citric acid in the process described above so that an excess of citric acid over the theoretical amount of 2 moles is used, a point is soon reached in which the product of the reaction is completely soluble in water without opalescent residue. The said point is then 2.1 moles of citric acid are used with one mole of the calcium reagent. Any excess of citric acid above the said 2.1 moles may be used and a completely water-soluble reaction product obtained. The solubilities of the products increase as the excess of citric acid is increased. It has been found that the reaction mass made from 2.1 or more moles of citric acid and 1 mole of calcium reagent is not the same as a mixture of the reaction mass made with the theoretical molar ratio of 2 to 1 to which is later added an equivalent amount of free citric acid. Thus, for example, the composition made with 3 moles of citric acid and 1 mole of calcium reagent is completely water soluble, but the composition made with 2 moles of citric acid and 1 mole of calcium reagent is not completely water soluble, nor can solution be obtained by adding an extra mole of citric acid. It is believed that the difference lies in the fact that in the case of the 3 to 1 ratio no insoluble di-calcium citrate is formed, as indicated by the absence of opalescence, while in the case of the 2 to 1 ratio some di-calcium citrate is formed which the excess of citric acid will not dissolve.

It has further been found that from the reaction mass formed from the interaction of 2.1 or more moles of citric acid and 1 mole of calcium reagent the excess citric acid in the end product may be extracted with a suitable solvent to leave behind substantially pure mono-calcium citrate which dissolves in water without giving an opalescent solution as in the case with the product formed from the stoichiometrical proportions of 2 moles of citric acid and 1 mole of calcium reagent. Suitable solvents for removing the excess citric acid and which do not dissolve the mono-calcium citrate, are acetone, the aliphatic alcohols from methyl to amyl, the ethylene glycol monoalkyl ethers, wherein the alkyl group is methyl, ethyl propyl or butyl, and the diethylene glycol monoalkyl ethers, wherein the alkyl group is methyl, ethyl propyl or butyl. Preferably the solvent should be fairly volatile so that it may be readily removed from the mono-calcium citrate after extraction, and of the solvents named the one of first choice is acetone.

The following examples illustrate the invention:

Example 1.—Procedure

As an illustration of the procedure to be followed in preparing the reaction masses described above from citric acid and a calcium reagent, the preparation from the stoichiometrical proportion of 2 moles of citric acid to 1 mole of calcium carbonate will be described:

Take 100 grams (1 mole) of powdered calcium carbonate (the U. S. P. precipitated product is preferred because it contains no acid-insoluble impurities) and 384 grams (2 moles) of powdered anhydrous citric acid and mix thoroughly in the dry state. Now add with continual stirring 185 ml. (10.3 moles approx.) of water, the ingredients being all at room temperature. A very thin paste is first formed which gradually thickens. Effervescence occurs. The temperature rises rather slowly due to the generation of heat. About half to two-thirds of the way through the reaction, while the mass is still a fairly fluid paste, the greater part of the effervescence is over and the stirrer may be stopped to permit the remaining effervescence to expand the mass into a porous state. Shortly afterwards the mixture thickens appreciably, then the temperature climbs rather rapidly and the whole mass "sets" into a substantially dry friable white product. Preferably the material is then left for a period, say overnight, before it is broken up and dried in gentle heat up to 140° F. (120° F. to 125° F. preferred). Finally the fragmented product is powdered.

A time/temperature chart for the reaction is as follows, the times being given in minutes after the addition of the water:

| Time | Temperature | Remarks |
|---|---|---|
| Mins. | °C. | |
| 0 | 23 | Paste very thin. |
| 3 | 25½ | Paste thickens slowly. |
| 5 | 25½ | |
| 6 | 25¾ | Towards the end of this period the stirrer may be stopped. |
| 7 | 26 | |
| 9 | 27 | |
| 9½ | 30 | Paste rather viscous—becoming whiter. |
| 10 | 33 | |
| 12 | 38½ | Product has "set" to a white, almost dry, friable, porous mass. |

In the above procedure, calcium carbonate is the preferred reagent partly because of the accompanying effervescence which brings about the formation of an expanded porous mass (rather like a honeycomb) which is more easily broken up for the subsequent drying than the products obtained with the other calcium reagents. However, the calcium carbonate may be substituted by 1 mole of calcium hydroxide (in which case more heat is generated) or by 1 mole of calcium oxide (in which case even more heat is generated and calcium hydroxide formed in process). To avoid violence of reaction, when using large quantities of materials, from too great a generation of heat with insufficient conductance away of said heat, both the hydroxide and the oxide of calcium are preferably avoided, since too much heat adversely affects the solubility of the end product. This procedure with materials at room temperature is the preferred procedure.

Example 2.—Products

The other compositions mentioned previously, which contain an excess of citric acid and which are completely water soluble, may be made by an entirely similar process except that it has been found that the quantity of water which must be added to the mixed dry solids in order that the end product of the reaction shall be comparatively dry and not a sticky unworkable mass, should be decreased as the excess of citric acid is increased. This variable quantity of water is related to mechanical convenience, and is not critical with respect to the result desired. In other words, the water employed may be the same in amount as used in Example 1. An amount is preferably chosen to give finally a friable cake. To illustrate this the following examples are given, and are carried out in accordance with the preferred procedure of Example 1. Each example is numbered for later reference, and the amounts of calcium carbonate (or other calcium reagent) of citric acid and of water are listed in moles. The list includes the product given in Example 1.

| Composition No. | Calcium carbonate | Citric acid | Water |
|---|---|---|---|
| | Moles | Moles | Moles |
| 2a | 1 | 2 | 10.3 |
| 2b | 1 | 2.1 | 10.0 |
| 2c | 1 | 2.3 | 9.5 |
| 2d | 1 | 2.5 | 8.6 |
| 2e | 1 | 2.7 | 7.8 |
| 2f | 1 | 2.9 | 7.0 |
| 2g | 1 | 3.1 | 6.2 |

All the compositions in the above table readily dissolve in water to give clear solutions without solid residue, with the exception of composition 2a which exhibits immediately upon solution a slight opalescence, but not sedimentary residue. It has been determined that for the preferred process of Example 1, as carried out with the amounts given in Example 2, the composition 2b is a critical composition below which and in the direction of composition 2a, the product dissolves with opalescence. Hence, at least 5% excess of citric acid over the stoichiometric quantities is required to secure a composition readily dissolving to a clear solution in water. In other words, opalescence is avoided by using at least 2.1 moles of citric acid to 1 mole of the calcium reagent.

The composition 2a has from 1% to 1.5% by weight of free citric acid, as determined by extraction of citric acid by acetone and then titration of the extract. When compositions from 2b through 2g are similarly tested, only the expected and used excess is found, namely, the 5% excess used for composition 2b, and 55% excess used for composition 2g.

Determinations of the solubilities of the various compositions per se and with added acids such as citric, phosphoric and hydrochloric have shown that greater solubility follows lower pH. However, as stated previously, it is not found that the solubility of a composition lower in the series can be made the same as that of a composition higher in the series by the mere addition of acid in amount corresponding to the difference in quantities of acid used in preparing the compositions.

On standing, solutions of the products of the present invention gradually deposit insoluble precipitates. This occurs more slowly as the amount of acid employed in producing the composition increases above the theoretical ratio. Thus, a solution of composition 2a deposits considerable solid matter in a few hours while a solution of composition 2g remains clear for about 9 days. The precipitates formed have been studied and appear to be mixtures of mono-calcium and di-calcium citrates.

The theoretical formula $Ca(C_6H_7O_7)_2 \cdot 2H_2O$ for mono-calcium citrate would indicate 8.7% calcium. Analysis of composition 2a has given 8.4% calcium. Composition 2e analyzes 6.7 calcium, and is the same as the value for

$$Ca(C_6H_7O_7)_2 \cdot 2H_2O + 0.7 C_6H_8O_7$$

which is the presumed nature of the composition. These data indicate that the compositions are largely as stated herein.

The preferred procedure carried out with materials at room temperature gives setting in twelve minutes in the case of composition 2a. The effect of lower temperature is to delay setting and of elevated temperature to hasten setting. Compositions 2a and 2b have been made by surrounding the reaction vessel with a bath of 60° to 70° C. and heating the mixed powder in said vessel. Boiling water is added. The reaction is vigorous with setting taking place in about two minutes. Also when the reaction vessel is kept at 10° C. and ice cold water added to powders to make compositions 2a and 2b, setting does not occur for more than an hour. The said two compositions 2a and 2b made both at lower and at higher than normal room temperature are slightly less soluble than made by the preferred procedure of Example 1.

All the compositions listed in the table above are useful per se in the compounding of pharmaceutical mixtures for the administration of calcium. Thus, mixtures of sodium bicarbonate and any of the compositions evolve carbon dioxide when added to water, and it has been found that in all cases clear sparkling solutions result, the addition of sodium bicarbonate in the case of composition 2a removing entirely the opalescence found when the composition above is dissolved in water. The opalescence may also be removed by adding to a solution of the composition sodium, potassium or ammonium hydroxides, and the result appears due to the formation of double salts of citric acid in solution. In preparing pharmaceutical mixtures of the compositions with sodium bicarbonate, it has been found preferable to use slightly less sodium bicarbonate than is required to neutralize the available acidity in order to improve the palatability of the resulting solution; although stable clear solutions may be made even when an excess of sodium bicarbonate is used. An illustrative formula is:

*Example 3*

| | Parts |
|---|---|
| Composition 2a | 100 |
| Sodium bicarbonate | 70 |

This may be dispensed as a tablet or as granules, 60 grains of the mixture containing 0.185 gram of calcium or approximately one-quarter of the minimum daily requirement of calcium. 60 grains of the composition dissolved in four ounces of water provides a solution with a pH of 5.7, as determined by a glass electrode. Various such effervescing mixtures for dispensing calcium are described and claimed in the copending application, Ser. No. 517,104 filed January 5, 1944 by Walter A. Compton and Richard S. Nicholls.

The compositions of the present invention have also been found useful in the preparation of effervescent mixtures in conjunction with acidic phosphates and sodium bicarbonate. For this purpose the compositions higher in the series have special uses in preparing mixtures with a high ratio of phosphorus to calcium which will dissolve in water to give clear solutions. From solutions of such mixtures it has been shown that both calcium and phosphorus are absorbed by the body and they therefore form useful means of administering calcium and phosphorus together. The matter covering the preparation and use of such mixtures is described and claimed in the copending application, Serial No. 517,105 filed January 5, 1945 by Walter A. Compton and Richard S. Nicholls.

The dry mixtures outlined above for producing products suitable for the administration of calcium or of calcium and phosphorus together, have been found to retain their properties and remain stable over an extended period of time.

The compositions described in the present invention do not behave, when admixed with sodium bicarbonate or other alkali metal salts of carbonic acid, with or without other ingredients, as do the component reagents from which the composition is formed. Thus, for example, 100 parts by weight of composition 2g are formed from 89 parts by weight of citric acid (anhydrous) and 15 parts by weight of calcium carbonate. If now the following mixture is made:

| | Parts |
|---|---|
| Composition 2g | 100 |
| Sodium bicarbonate | 90 | and dissolved in water, there is formed, as soon as effervescence ceases, a clear solution.

On the other hand the mixture:

| | Parts |
|---|---|
| Citric acid | 89 |
| Calcium carbonate | 15 |
| Sodium bicarbonate | 90 | does not form a clear solution at the cessation of effervescence although if the suspension is allowed to stand it will in time clear.

Further—

| | Parts |
|---|---|
| Composition 2g | 100 |
| Mono-calcium phosphate | 35 |
| Sodium bicarbonate | 130 | will effervesce to a clear solution, while—

| | Parts |
|---|---|
| Citric acid (anhyd.) | 89 |
| Calcium carbonate | 15 |
| Mono-calcium phosphate | 35 |
| Sodium bicarbonate | 130 | will not form a clear solution, but will produce a heavy precipitate which does not go into solution on standing.

Hence, the products of the present invention are not equivalent to a dry mixture of the citric acid and calcium reagents on which the process of the present invention has not been performed.

The examples cited in the table above are not intended to limit the invention to the specific ratios of citric acid and calcium reagents given in the table; any ratios upwards from the stoichiometrical ratio of 2 to 1 may be employed with results similar to those described. Nor is it intended that the upper cited ratio of 3.1 moles to 1 shall have any limiting significance, although within the compass of the examples given are to be found all the compositions of greatest use in the copending applications previously mentioned.

*Example 4.—Isolation of mono-calcium citrate*

As an example of the isolation of mono-calcium citrate by removing the excess citric acid from the reaction mass obtained by the interaction of 2.1 or more moles of citric acid with 1 mole of calcium reagent in the process already described, the use of acetone, the preferred solvent, on composition 2g will be given.

Take 100 grams of composition 2g, finely powdered, and add to it 125 cc. of acetone. By shaking or other means of agitation keep the composition suspended in the acetone for a period of 10 to 15 minutes, then filter the acetone extract. Wash the filter cake with two small quantities of acetone, and, if a suction filter has been used, as is preferred, dry the residue on the filter as far as possible. Finally, remove the residue and complete the drying in air or in an oven at approximately 125° F. The product so formed, which is in powdered form, is the required mono-calcium citrate.

Analyses of samples of products so formed have shown a calcium content of 8.68 to 8.71% which are in excellent agreement with the calcium content of 8.7% for the formula $Ca(C_6H_7O_7)_2 \cdot 2H_2O$. Further, a determination of the equivalent weight of the product gave 115 as compared with the theoretical value of 114.5 for $Ca(C_6H_7O_7)_2 \cdot 2H_2O$. These results are given to indicate that the product formed is as stated.

The yield of product is excellent being 66 grams from 100 grams of composition 2g, or almost the theoretical quantity. The product has a fairly high solubility of approximately 1 part in 5 parts of water at room temperature of 20° to 23° C., and the solution formed is substantially clear, as contrasted with the solution of composition 2a which is opalescent.

For use in pharmaceutical mixtures for dispensing calcium or calcium and phosphorus together, such as outlined in the case of the other compositions of the invention, the monocalcium citrate obtained by the process of this example does not produce more stable solutions in conjunction with acidic phosphates than does composition 2a, and for such purposes does not present significant advantages over compositions 2a to 2g.

A similar residue may be obtained by extracting, as described above, any of the reaction masses obtained by reacting together 2.1 or more moles of citric acid and 1 mole of calcium reagent, that is, by extracting any of the compositions of the first part of the invention which are completely water soluble. Further, in place of acetone other solvents for citric acid may be used with similar results, as mentioned hereinabove. Where solvents of low volatility are employed to extract citric acid, it is preferred to wash out excess solvent by use of a compatible solvent of high volatility.

In the procedure used for Examples 1 and 2, the cake is dried to remove water and to provide a dry product. Before drying, the desired mono-calcium citrate is already formed and present in the moist cake. In using acetone to extract excess citric acid, the cake may be moist for such extraction and need not be dried. The acetone dehydrates the cake. In cases where substantially no free citric acid is present, as in composition 2a, the moist cake may be dried by washing with acetone, or other suitable dehydrating solvent, such as ethyl alcohol.

Having described the present invention, which by processes and products thereof yields acidic calcium compositions in convenient form for incorporating in pharmaceutical preparations, numerous aspects as to process and product are set forth in the appended claims.

I claim:

1. The method of making solid mono-calcium citrate dihydrate which comprises incorporating together water and solid material consisting of 1 mole of calcium reagent selected from the group consisting of calcium oxide, calcium hydroxide and calcium carbonate, and at least 2 moles of solid acid selected from the group consisting of anhydrous citric acid and hydrated citric acid, said water being present in quantity to provide a fluid paste while thoroughly mixing the said ingredients, whereby reaction ensues with the generation of heat which reaction leads to thickening of the mass and then setting to a solid cake consisting substantially entirely of water, mono-calcium citrate dihydrate and any excess of citric acid over substantially said 2 moles.

2. The method of making solid mono-calcium citrate dihydrate which comprises incorporating together water and solid material consisting of 1 mole of calcium reagent selected from the group consisting of calcium oxide, calcium hydroxide and calcium carbonate, and at least 2.1 moles of solid acid selected from the group consisting of anhydrous citric acid and hydrated citric acid, said water being present in quantity to provide a fluid paste while thoroughly mixing the said ingredients, whereby reaction ensues with the generation of heat, which reaction leads to thickening of the mass and then setting to a solid cake consisting substantially entirely of water, mono-calcium citrate dihydrate and any excess of citric acid over 2 moles, said solid cake being characterized by dissolution in water of all the calcium citrate therein to form a clear solution.

3. The method of making solid mono-calcium citrate dihydrate which comprises incorporating together water and solid material consisting of 1 mole of calcium carbonate and at least 2.1 moles of solid acid selected from the group consisting of anhydrous citric acid and hydrated citric acid, said water being present in quantity to provide a fluid paste while thoroughly mixing the said ingredients, whereby reaction ensues with the generation of heat and of carbon dioxide, which reaction leads to thickening of the mass and then setting to a solid porous cake consisting substantially entirely of water, mono-calcium citrate dihydrate and any excess of citric acid over 2 moles, said solid cake being characterized by dissolution in water of all the calcium citrate therein to form a clear solution.

4. The method of making solid mono-calcium citrate dihydrate which comprises incorporating together water and solid material consisting of 1 mole of calcium reagent selected from the group consisting of calcium oxide, calcium hydroxide and calcium carbonate, and at least 2 moles of solid acid selected from the group consisting of anhydrous citric acid and hydrated citric acid, said water being present in quantity to provide a fluid paste while thoroughly mixing the said ingredients, whereby reaction ensues with the generation of heat, which reaction leads to thickening of the mass, and then setting to a solid cake consisting substantially entirely of water, mono-calcium citrate dihydrate and any excess of citric acid over substantially said 2 moles, and separating free water from mono-calcium citrate dihydrate.

5. The method of making dry solid mono-calcium citrate dihydrate which comprises incorporating together water and solid material consisting of 1 mole of calcium reagent selected from the group consisting of calcium oxide, calcium hydroxide and calcium carbonate, and at least 2 moles of solid acid selected from the group consisting of anhydrous citric acid and hydrated citric acid, said water being present in quantity to provide a fluid paste while thoroughly mixing the said ingredients, whereby reaction ensues with the generation of heat which reaction leads to thickening of the mass and then setting to a solid cake consisting substantially entirely of water, mono-calcium citrate dihydrate and any excess of citric acid over substantially said 2 moles, and evaporating all the free water from said cake.

6. The method of making dry solid mono-calcium citrate dihydrate which comprises incorporating together water and solid material consisting of 1 mole of calcium reagent selected from the group consisting of calcium oxide, calcium hydroxide and calcium carbonate, and at least 2 moles of solid acid selected from the group consisting of anhydrous citric acid and hydrated citric acid, said water being present in quantity to provide a fluid paste while thoroughly mixing the said ingredients, whereby reaction ensues with the generation of heat which reaction leads to thickening of the mass and then setting to a solid cake consisting substantially entirely of water, mono-calcium citrate dihydrate and any excess of citric acid over substantially said 2 moles, and removing citric acid from a mass containing the resulting mono-calcium citrate dihydrate and citric acid by the extracting action of a solvent for citric acid which is a non-solvent for mono-calcium citrate dihydrate.

7. The method of making dry solid mono-calcium citrate dihydrate which comprises incorporating together water and solid material consisting of 1 mole of calcium reagent selected from the group consisting of calcium oxide, calcium hydroxide and calcium carbonate, and at least 2 moles of solid acid selected from the group consisting of anhydrous citric acid and hydrated citric acid, said water being present in quantity to provide a fluid paste while thoroughly mixing the said ingredients, whereby reaction ensues with the generation of heat which reaction leads to thickening of the mass and then setting to a solid cake consisting substantially entirely of water, mono-calcium citrate dihydrate and any excess of citric acid over substantially said 2 moles, and removing water and any excess citric acid from said cake while providing dry mass of mono-calcium citrate dihydrate in a form substantially free from free citric acid by the dissolving action of acetone upon water and citric acid.

RICHARD S. NICHOLLS.